United States Patent
Davey et al.

(10) Patent No.: US 6,564,872 B2
(45) Date of Patent: May 20, 2003

(54) CONTROL OF HYDROCARBON WELLS

(75) Inventors: Peter John Davey, Weston Super Mare (GB); David John Luckhurst, Redland (GB)

(73) Assignee: ABB Offshore Systems Limited (GB)

( * ) Notice: Subject to any disclaimer, the term of this patent is extended or adjusted under 35 U.S.C. 154(b) by 0 days.

(21) Appl. No.: 09/809,743

(22) Filed: Mar. 15, 2001

(65) Prior Publication Data

US 2002/0040786 A1 Apr. 11, 2002

(30) Foreign Application Priority Data

Oct. 6, 2000 (GB) ............................................. 0024561

(51) Int. Cl.$^7$ ............................................. E21B 29/12
(52) U.S. Cl. ...................... 166/344; 166/366; 166/368; 137/884
(58) Field of Search ................................ 166/344, 368, 166/366; 137/884, 271, 269

(56) References Cited

U.S. PATENT DOCUMENTS

| | | | | |
|---|---|---|---|---|
| 3,513,876 A | * | 5/1970 | Tarbox ........................ 137/269 |
| 3,806,088 A | * | 4/1974 | Stoneman et al. .......... 137/884 |
| 3,817,281 A | | 6/1974 | Lewis et al. |
| 3,957,079 A | * | 5/1976 | Whiteman ............. 137/596.18 |
| 3,993,091 A | * | 11/1976 | Loveless ...................... 137/269 |
| 4,078,574 A | * | 3/1978 | Kosarzecki ................... 137/269 |
| 4,265,313 A | * | 5/1981 | Arnaudeau .................. 166/366 |
| 4,328,826 A | | 5/1982 | Baugh |
| 4,378,848 A | * | 4/1983 | Milberger .................... 166/351 |
| 4,404,989 A | * | 9/1983 | LeMoine ................... 137/236.1 |
| 4,488,343 A | * | 12/1984 | Kobelt ......................... 137/271 |
| 4,607,701 A | * | 8/1986 | Gundersen ................... 137/594 |
| 4,848,475 A | * | 7/1989 | Dean et al. .................. 166/335 |
| 5,277,225 A | | 1/1994 | Smith |
| 5,342,098 A | * | 8/1994 | Wilkins .................... 285/124.1 |
| 6,032,742 A | * | 3/2000 | Tomlin et al. .............. 166/345 |
| 6,102,068 A | | 8/2000 | Higdon et al. |
| 6,328,070 B2 | * | 12/2001 | Clayton et al. ............. 137/271 |

FOREIGN PATENT DOCUMENTS

| | | |
|---|---|---|
| EP | 0 767 330 A2 | 8/1996 |
| EP | 0 957 300 A2 | 5/1999 |
| GB | 999540 | 7/1965 |
| GB | 1490034 | 10/1977 |
| GB | 1562039 | 3/1980 |
| GB | 2212865 A | 8/1989 |
| GB | 2212865 | 8/1989 |
| GB | 2257472 | 1/1993 |
| GB | 2257472 A | 1/1993 |
| GB | 2 285 819 A | 7/1995 |
| WO | PCT/GB99/02088 | 1/2000 |
| WO | PCT/US00/05015 | 2/2000 |
| WO | PCT/US99/17840 | 2/2000 |

* cited by examiner

*Primary Examiner*—Thomas B. Will
*Assistant Examiner*—Thomas A. Beach
(74) *Attorney, Agent, or Firm*—Barnes & Thornburg

(57) ABSTRACT

Modern subsea wells utilise an electrohydraulic control system which switches hydraulic power to various control components in dependence on received control signals. The mounting and interconnection of the control components tends to be complicated. The invention provides a manifold comprising a first manifold body 6 having a number of openings and flow passageways therethrough. The manifold body is selectively configurable by selecting predetermined openings in order to achieve a desired configuration of flow passageways between control devices 1, 2, 13, 4. The manifold simplifies the interconnection of the hydraulic components and provides greater flexibility in the location of the components. The manifold body also provides a platform for mounting the control devices.

6 Claims, 4 Drawing Sheets

CONTROL OF HYDROCARBON WELLS

BACKGROUND OF THE INVENTION

This invention relates to the control of hydrocarbon wells, such as subsea wells.

Subsea wells incorporate a multiplicity of devices requiring controlled operation. Modern wells utilise an electrohydraulic control system, typically located on the Christmas tree situated above the well bore. An umbilical from the surface provides hydraulic power, electrical power and electrical or optical control signals to the control system. The control system switches hydraulic power to various control components, in dependence on the received control signals. Components controlled by the control system may include safety valves, packers and flow control devices such as chokes.

A difficulty which may be encountered with the design and manufacture of such control systems is that the mounting and interconnection of the multiplicity of components tends to be complicated, particularly with regard to the hydraulic pipework needed to transmit hydraulic power to and between the components.

BRIEF SUMMARY OF THE INVENTION

The invention provides a manifold arrangement for distributing hydraulic fluid to control devices, the arrangement comprising a manifold body having a plurality of openings and flow passageways therethrough, the manifold body being selectively configurable by selection of predetermined openings so as to achieve a desired configuration of flow passageways between the control devices.

The provision of a configurable manifold greatly simplifies the interconnection of hydraulic components and provides greater flexibility in the location of components.

BRIEF DESCRIPTION OF THE DRAWINGS

The invention will now be described, by way of example, with reference to the above drawings, in which.

Like reference numerals refer to like parts throughout the specification.

DETAILED DESCRIPTION OF THE ILLUSTRATED EMBODIMENT

Figure 1:
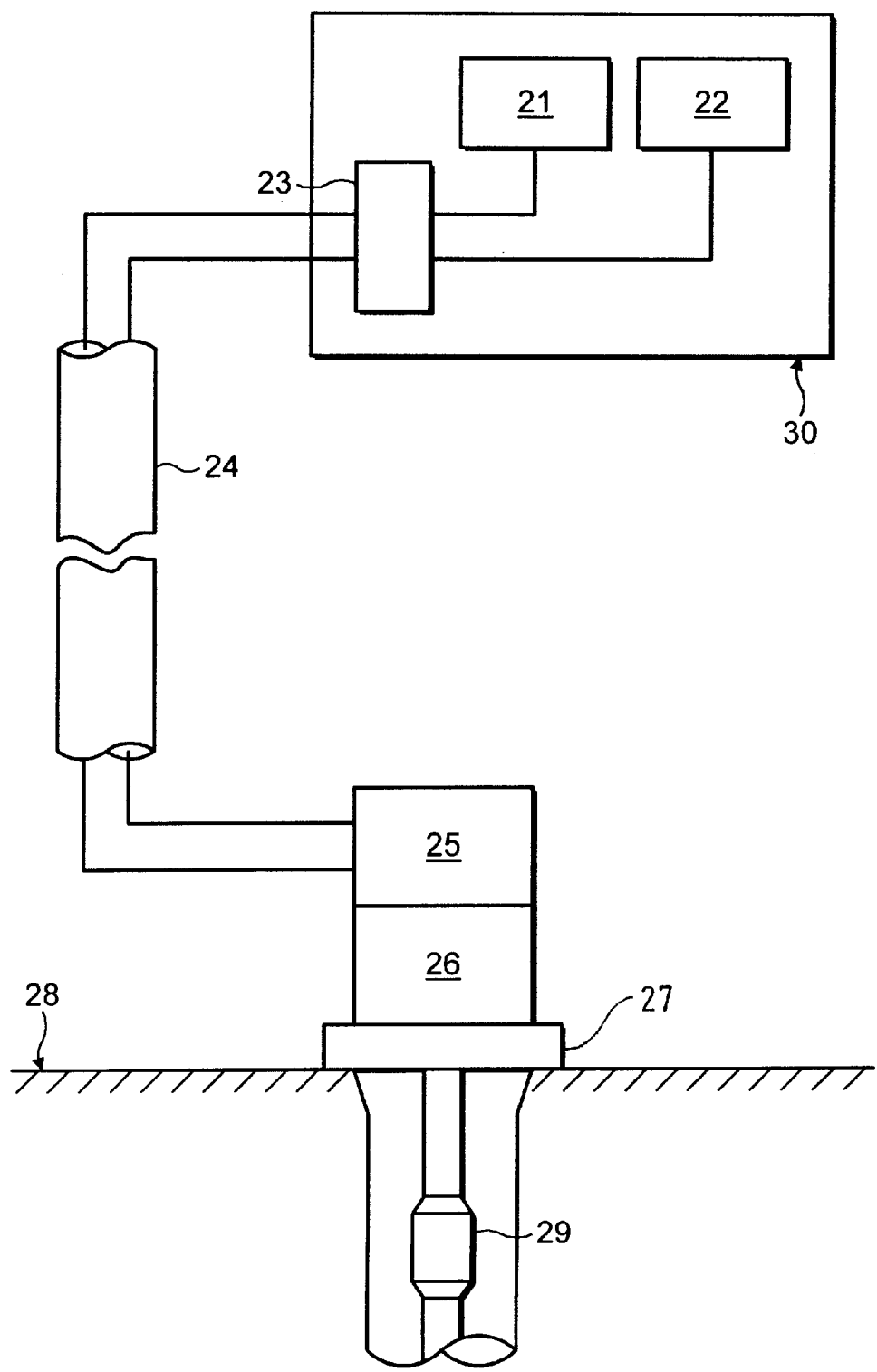
FIG. 1 is a schematic illustration of a hydrocarbon production system.

Referring to FIG. 1, the hydrocarbon production system comprises generally a topside installation located on a platform 30, which may be fixed or floating, on a ship or may be shore based. Located on the platform is a hydraulic supply unit 21 and a sensor control unit 22. Outputs from these units are routed to a junction box 23, at which they are combined and packaged into an umbilical 24 which passes from the platform to the seabed 28. The umbilical 24 terminates at a control module 25 associated with a Christmas tree 26 located on a well head 27 at the seabed 28.

The Christmas tree 26 includes a plurality of valves, actuators and pressure and/or temperature transducers. The valves control the flow of chemicals and hydrocarbons through the tree. The sensor control unit 22 monitors and interrogates sensors located in the tree 26 and downhole. The sensors are operated either electrically or optically. The hydraulic supply unit 21 provides hydraulic power for downhole devices located in the well, for example the flow control device 29 shown in this drawing, as well as tree located devices.

Figure 2:
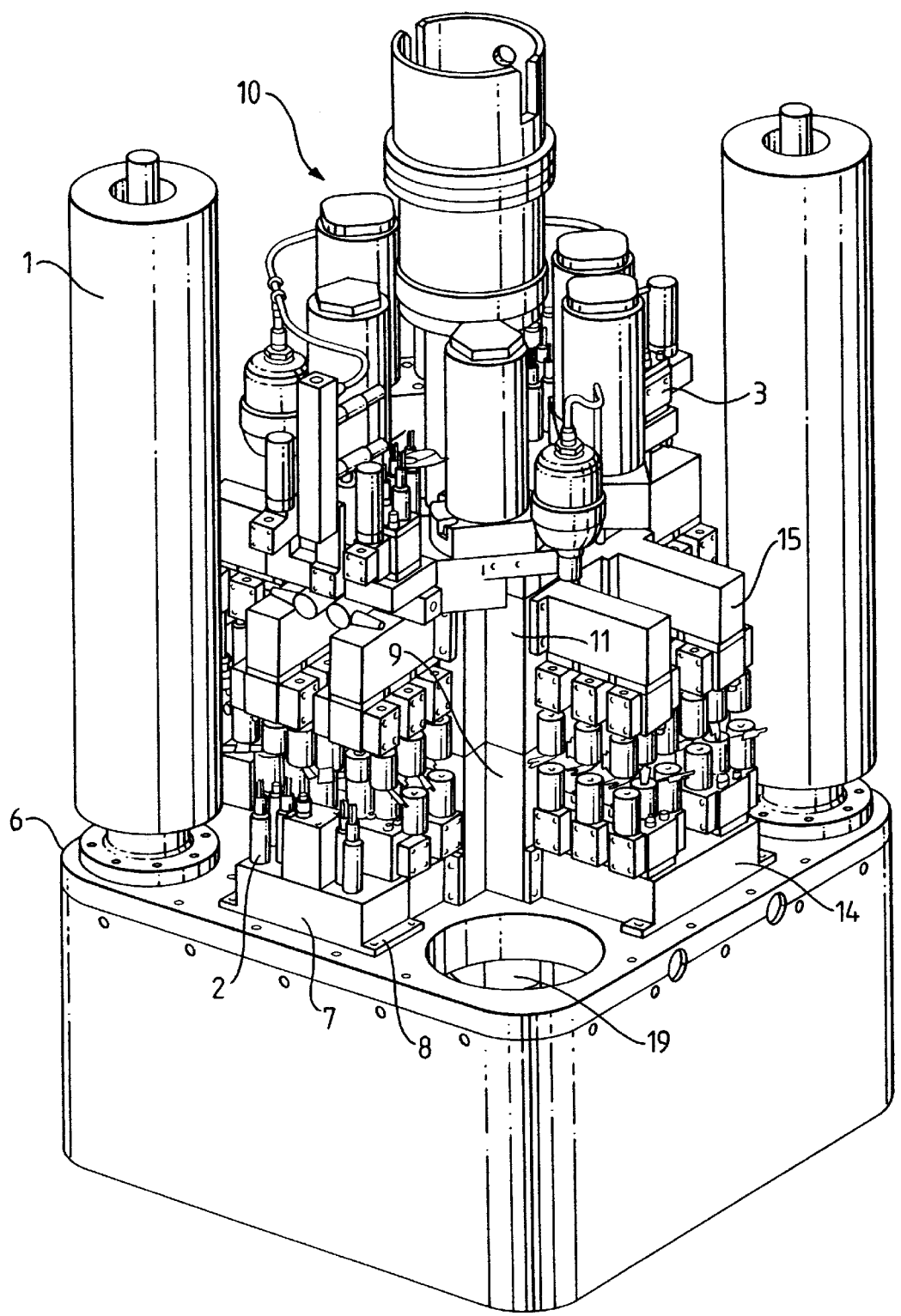
FIG. 2 is a perspective view of a control system constructed according to the invention.
Figure 3:
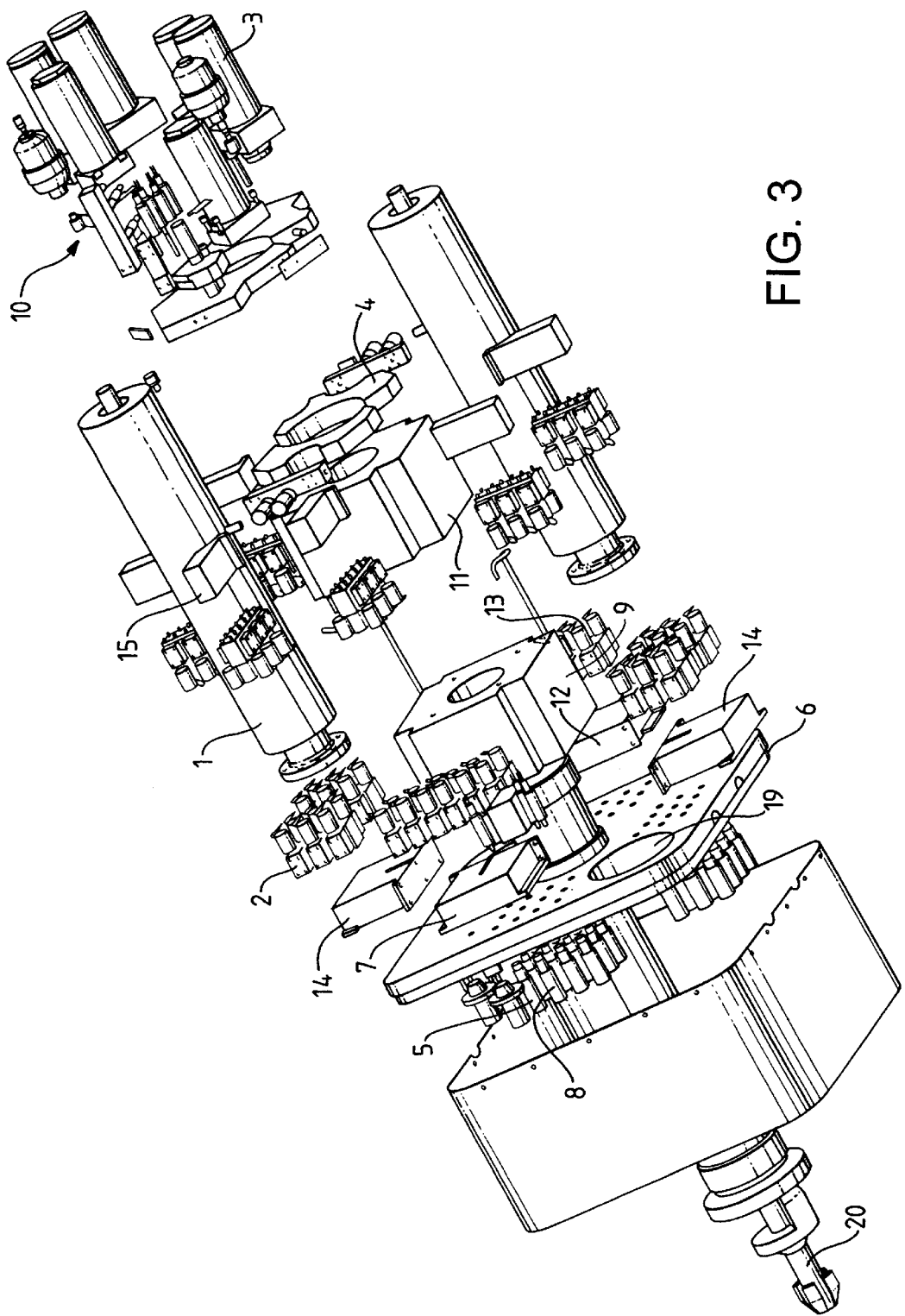
FIG. 3 is an exploded view of the system of FIG. 2.

The control module 25 comprises a multiplicity of components, as can be seen in the detailed drawings of FIGS. 2 and 3.

The umbilical terminates at the control module 25 and supplies hydraulic power at high pressure and low pressure into the control system. High pressure is supplied to components via a high pressure connector 5 and low pressure is supplied via a low pressure connector (not shown in these drawings). The umbilical also provides electric power and electrical and/or optical signals to electronic devices in the control module. These electronic components are mounted in pressurised containers fitted to the base plate in the mounting hole 19. The electronic system of the control module has not been illustrated for the purposes of clarity.

The components of the control module 25 include hydraulic accumulators 1, directional control valves 2, 13, filters 3 and flow meters 4. These components are mounted on a base plate 6, which, in accordance with the invention, is also a manifold having a large plurality of openings and passages therethrough. Components are mounted in the control module by simply plugging them into openings in the manifold 6. Unused openings and passages are merely blanked. Therefore, the components of the control module are mounted simply and securely, without the need for individual pipes between the components.

A second manifold 7 is also provided, which functions as a submanifold for the base plate manifold 6. This second manifold 7, which, for the purposes of clarity, shall be referred to as a supply manifold, has a number of ports and hydraulic feed passages machined in it. Ports in the supply manifold 7 co-operate with openings in the base plate manifold 6, in order to provide flow paths therethrough.

The high pressure feed is coupled, via the base plate manifold 6 to the supply manifold 7, which manifold also provides a support platform for a set 2 of directional control valves. In this drawing, the set 2 of valves comprises four high pressure directional control valves in communication with the supply manifold 7. Again, unused or undesired ports and flow paths in this manifold 7 may be simply blanked as necessary. It will be appreciated that the provision of further manifolds in communication with the main manifold, providing mounting platforms for components of the control module, further simplifies the mounting and interconnection of the components of the control system. In this manner, the hydraulic arrangement of the control system may be built up in a modular manner.

One of the passages in the supply manifold 7 is in communication with another manifold 9 which, for the purposes of clarity, shall be referred to as the lower column manifold. This lower column manifold 9 also has a multiplicity of ports and hydraulic feed channels machined in it. One of these provides a flow path through a similar, upper column, manifold 11 to a fluid processing assembly 10. Source hydraulic power is therefore transmitted via these manifolds to the fluid processing assembly 10. The column manifolds 9, 11 also provide a flow path to return processed fluid from the fluid processing assembly 10 back to the supply manifold 7, and thus to each high pressure directional control valve in the set 2.

Each directional control valve has an output when the valve is opened and vents when not open. Therefore, further channels are provided in the supply manifold 7 to connect these to the base plate 6 and thus to the output connectors 8 of FIG. 3.

Turning now to the low pressure components, the low power hydraulic feed is coupled, via the base plate manifold 6, directly to a further supply manifold 12. This low pressure supply manifold 12 also provides a support platform for hydraulic components such as low pressure directional control valves. This supply manifold 12 connects the low pressure hydraulic power source to a portion of the fluid processing assembly, in a similar mariner to the high pressure system. This is done via the two column manifolds 9, 11, which also provide the flow path for the processed low pressure hydraulic fluid from the processing assembly to the directional control valves fitted to the low pressure supply manifold 12.

In general, there is a greater requirement for low pressure components in a subsea control module than there is for high pressure components. Therefore, provision is made for extra low pressure components by the incorporation of extra low pressure supply manifolds, such as those indicated by the reference numerals 14 and 15. These additional manifolds are made in a similar fashion to the previous manifolds and are arranged to interface directly with either or both of the column manifolds 9, 11. In these drawings, the manifold 14 accommodates six low pressure directional control valves and interfaces with the lower column manifold 9. The manifold 15 is smaller and thus can only accommodate three directional control valves, this manifold being arranged to interface with the upper column manifold 11. The control system as shown in these drawings can accommodate two of the manifolds 14 having six valves and eight of the type 15 having three valves. In combination with the valves in communication with the manifold 12, as many as forty low pressure directional control valves can be accommodated. Previously, this would have required a large amount of intricate pipework which would have to be carefully designed and manufactured and arranged to fit in as small a volume as possible. However, it will be appreciated that the present invention provides a greater flexibility and simplicity in the mounting of these components as well as providing economy of volume.

Figure 4:
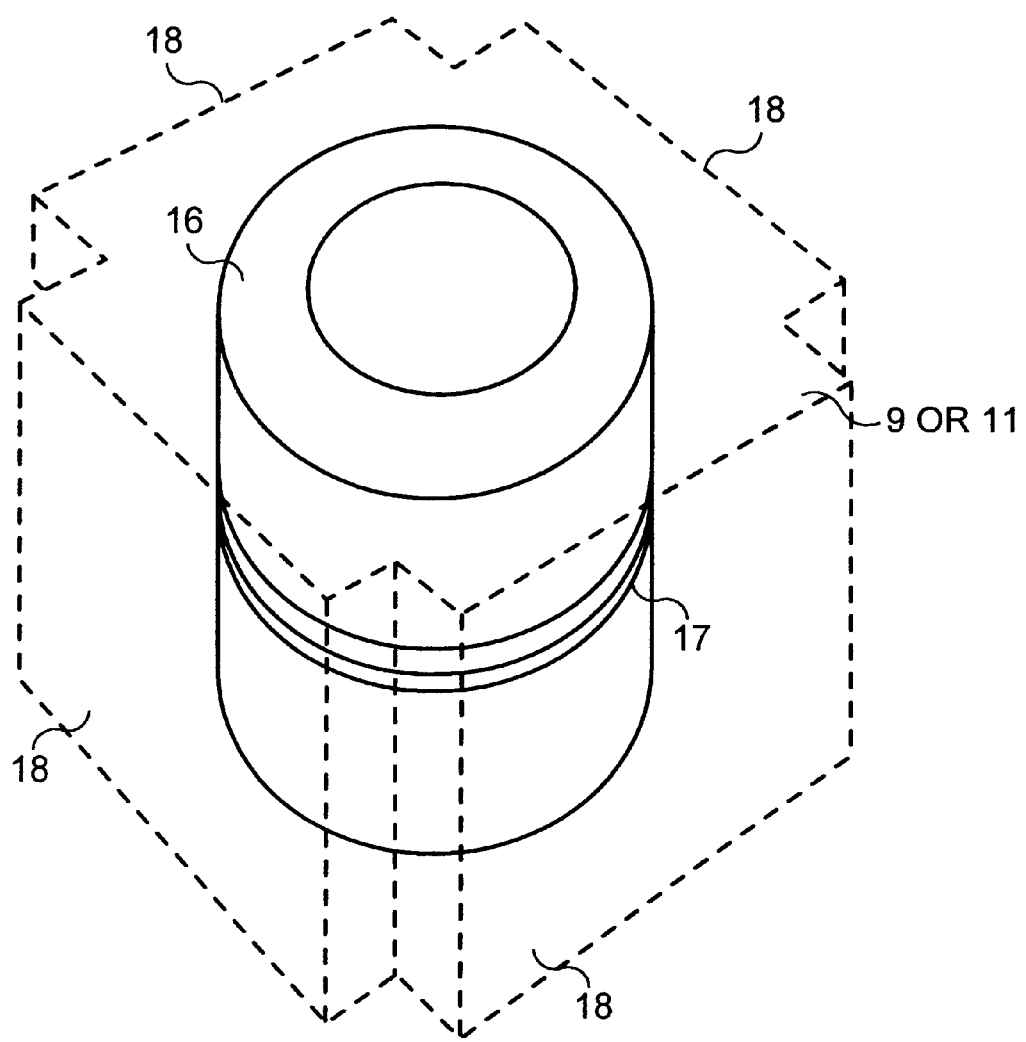
FIG. 4 is a schematic view of the ring manifold of FIGS. 2 and 3.

The inventors have devised a novel distribution manifold for the purpose of distributing hydraulic fluid to an of these supply manifolds in communication with directional control valves. This novel manifold is shown schematically in FIG. 4 and, for clarity, shall be referred to as the ring distribution manifold. FIG. 4 illustrates one of the column manifolds 9, 11, at the centre of which is a thick walled cylinder 16. The cylinder has a channel 17 machined around its circumference, hence the term ring manifold. The channel or ring 17 is fed with processed hydraulic fluid from the fluid processing assembly 10, via one of the fluid passageways in the column manifold. The vertical faces 18 of the column manifold communicate with respective supply manifolds, and there are passageways machined from the vertical faces 18 to the ring 17, to provide fluid passageways for the supply of processed hydraulic fluid to all of the manifolds supplying the low pressure components.

There is a similar requirement to connect together the vent outlets of each directional control valve, and this system is ideally suited for this purpose. Therefore, in practice, there are typically two rings 17 machined in the outer circumference of the cylinder 16. The second ring is arranged to handle the multiple vent connections through other fluid passageways machined in the faces 18.

In simpler system configurations, one of the column manifolds 9,11 may be dispensed with so that the fluid processing assembly interfaces directly with the other column manifold. Conversely, for more complex systems, it is possible to add further tiers of column manifolds and other supply manifolds.

The complete subsea control module is housed in a container known as a pod and is attached to the Christmas tree by a pod locking device, indicated generally by the reference numeral 20 in FIG. 3. The hydraulic connections in the base plate 6 meet with their equivalent in a similar base plate attached to the Christmas tree (not shown). The hydraulic connections lock and seal automatically when the subsea control module pod is offered to the Christmas tree using a remotely operated vehicle.

What is claimed is:

1. A manifold arrangement for distributing hydraulic fluid to control devices, the arrangement comprising a first manifold body having a plurality of openings and flow passageways therethrough, the manifold body being selectively configurable by selection of predetermined openings so as to achieve a desired configuration of flow passageways between the control devices, the manifold arrangement further comprising a plurality of further manifold bodies in communication with the first manifold body, wherein the plurality of manifold bodies each has openings arranged to co-operate with openings in the first manifold body in order to provide flow passageways through and between the manifold bodies, wherein at least some of the plurality of manifold bodies are arranged to communicate with each other via a common fluid passageway and wherein the common fluid passageway comprises a ring machined into one of the plurality of manifold bodies.

2. A manifold arrangement as claimed in claim 1 wherein the first manifold body also provides a platform for mounting at least some of the control devices.

3. A manifold arrangement as claimed in claim 1, in which the desired configuration is achievable by blocking the openings of undesired flow passageways.

4. A manifold arrangement as claimed in claim 2 wherein at least one of said further manifold bodies comprises a platform for mounting at least some of said control devices to the manifold arrangement.

5. A method of distributing hydraulic fluid to control devices, said control devices being accessed by said hydraulic fluid through a first manifold body having a plurality of openings and flow passageways therethrough, and a plurality of additional manifold bodies in hydraulic communication with the first manifold body, each additional manifold body having flow passages therethrough and having openings arranged to cooperate with openings in the first manifold body to provide flow passageways through and between the first and additional manifold bodies; the method comprising the steps of a) providing a common fluid passageway allowing fluid communication between at least some of the additional manifold bodies, the step of providing a common fluid passageway comprises the step of machining a ring into a portion of at least on of the first and additional manifold bodies;

b) hydraulically connecting the control devices to selected ones of said openings;

c) blocking off selected ones of said openings to provide a selected configuration of fluid passageways between the control devices.

6. The method of claim 3 wherein said ring provides a channel in communication with certain of said flow passages in said at least one first and additional manifold bodies.

* * * * *